(12) United States Patent
Hiraki et al.

(10) Patent No.: US 11,747,659 B2
(45) Date of Patent: Sep. 5, 2023

(54) OPTICAL MODULATOR

(71) Applicant: Nippon Telegraph and Telephone Corporation, Tokyo (JP)

(72) Inventors: Tatsurou Hiraki, Tokyo (JP); Takaaki Kakitsuka, Tokyo (JP); Shinji Matsuo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 218 days.

(21) Appl. No.: 16/971,523

(22) PCT Filed: Feb. 8, 2019

(86) PCT No.: PCT/JP2019/004584
§ 371 (c)(1),
(2) Date: Aug. 20, 2020

(87) PCT Pub. No.: WO2019/163559
PCT Pub. Date: Aug. 29, 2019

(65) Prior Publication Data
US 2020/0400977 A1 Dec. 24, 2020

(30) Foreign Application Priority Data
Feb. 22, 2018 (JP) .................................. 2018-029445

(51) Int. Cl.
*G02F 1/025* (2006.01)

(52) U.S. Cl.
CPC ........ *G02F 1/025* (2013.01); *G02F 2201/063* (2013.01)

(58) Field of Classification Search
CPC ............................ G02F 1/025; G02F 2201/063
USPC .......................................................... 385/1–3
See application file for complete search history.

(56) References Cited

U.S. PATENT DOCUMENTS

| 5,381,023 A | 1/1995 | Komatsu |
| 8,731,344 B2 | 5/2014 | Yagi |
| 2004/0208454 A1* | 10/2004 | Montgomery ........ G02F 1/2257 385/40 |
| 2011/0206313 A1 | 8/2011 | Dong et al. |
| 2013/0301975 A1 | 11/2013 | Spann et al. |
| 2013/0336611 A1 | 12/2013 | Lee et al. |

(Continued)

FOREIGN PATENT DOCUMENTS

| JP | 2010113084 A | 5/2010 | |
| JP | 2015-15396 * | 1/2015 | ............... H01S 5/20 |

(Continued)

OTHER PUBLICATIONS

Park, et al., "Monolithic Integration of InGaAsP MZI Modulator and InGaAs Driver MOSFET using III-V CMOS Photonics," Optical Society of America (OFC) 2017, 3 pages.

(Continued)

*Primary Examiner* — Robert Tavlykaev
(74) *Attorney, Agent, or Firm* — Slater Matsil, LLP

(57) ABSTRACT

The optical modulator includes a lower cladding layer formed on a substrate, a core formed on the lower cladding layer, and an upper cladding layer formed on the core. The core is made of an InP-based semiconductor having a bandgap corresponding to a desired wavelength. Refractive indexes of the lower cladding layer and upper cladding layer are equal to or less than a refractive index of InP.

10 Claims, 4 Drawing Sheets

(56) References Cited

U.S. PATENT DOCUMENTS

2015/0293384 A1* 10/2015 Ogawa ................. G02F 1/2257
  385/11
2016/0054596 A1* 2/2016 Lee ........................ G02F 1/025
  385/3

FOREIGN PATENT DOCUMENTS

| JP | 2017040841 A | 2/2017 |
| JP | 2017072807 A | 4/2017 |
| JP | 2018046258 A | 3/2018 |

OTHER PUBLICATIONS

Sekine et al., "Numberical analysis of carrier-depeltion InGaAsP optical modulator with lateral PN junction formed on III-V-on-insulator wafer," https://doi.org/10.7567/JJAP.56.04CH09, Japanese Journal of Applied Physics, 56, 04CH09, 2017, 5 pages.

* cited by examiner

OPTICAL MODULATOR

CROSS-REFERENCE TO RELATED APPLICATIONS

This application is a national phase entry of PCT Application No. PCT/JP2019/004584, filed on Feb. 8, 2019, which claims priority to Japanese Application No. 2018-029445, filed on Feb. 22, 2018, which applications are hereby incorporated herein by reference.

TECHNICAL FIELD

The present invention relates to an optical modulator using a core made of an InP-based semiconductor.

BACKGROUND

Optical modulators are key devices for large-capacity optical communication. In the optical modulators, a part where optical modulation is performed, such as a core, is made of various materials, such as lithium niobate (LiNbO$_3$), InP-based material, and silicon (Si). Among them, the InP-based material can have a large refractive index change by F-K (Franz-Keldysh) effect, Pockels effect, QCSE (Quantum Confined Stark Effect) effect, carrier plasma effect, band filling effect, and the like, and is promising as modulator material.

For example, Patent Literature 1 describes an optical modulator including a refractive index control region where a refractive index control layer 302 made of n-type InGaAsP is provided on an n-type cladding layer 301 made of InP, and a p-type cladding layer 303 made of InP is disposed thereon as shown in FIG. 3. Patent Literature 1 reports that applying a reverse bias to the refractive index control layer 302 serving as a core allows for refractive index modulation due to the F-K effect, carrier plasma effect, and band filling effect.

CITATION LIST

Patent Literature

Patent Literature 1: Japanese Patent Laid-Open No. 2010-113084.

SUMMARY

Technical Problem

In the above-described optical modulator in which the core is made of an InP-based material, it is necessary to increase a part where the electric field distribution of light and a charge depletion region overlap in order to improve modulation efficiency. For this purpose, it is important to increase a refractive index difference between the core and cladding so that optical confinement is increased. However, in conventional optical modulators, as compared with InGaAsP which the core is made of, a cladding layer sandwiching this layer from above and below is made of an InP-based semiconductor such as InP. For this reason, the refractive index difference between them cannot be increased, and there are problems that it is not easy to increase the part where the electric field distribution of light and the charge depletion region overlap, and it is not easy to improve modulation efficiency.

Embodiments of the present invention have been made to solve the above problems and an object is to make it possible to more easily improve modulation efficiency in an optical modulator using a core made of an InP-based semiconductor.

Means for Solving the Problem

An optical modulator according embodiments of to the present invention includes a lower cladding layer having a refractive index equal to or less than a refractive index of InP formed on a substrate, a core formed on the lower cladding layer, the core being made of an InP-based semiconductor having a bandgap corresponding to a desired wavelength, an upper cladding layer having a refractive index equal to or less than the refractive index of InP formed on the core, and electric field application means that applies an electric field to the core.

In the above-described optical modulator, the core may be made of InGaAsP. In addition, the lower cladding layer and upper cladding layer may be made of silicon oxide.

In the above-described optical modulator, the electric field application means includes a first semiconductor layer of a first conductive type and a second semiconductor layer of a second conductive type formed with the core interposed therebetween in a direction horizontal to a plane of the substrate.

In the above-described optical modulator, the core may include a first core of the first conductive type and a second core of the second conductive type. In this case, the first core and second core may be formed in a state of being disposed in a direction parallel to the plane of the substrate, or the first core and second core may be formed in a state of being stacked on the lower cladding layer.

In the above-described optical modulator, on one side of the core, the first semiconductor layer may be formed in contact only with the first core in the core, and on another side of the core, the second semiconductor layer may be formed in contact only with the second core in the core.

Effects of Embodiments of the Invention

As described above, according to embodiments of the present invention, since the lower cladding layer and upper cladding layer having a refractive index equal to or less than the refractive index of InP are disposed above and below the core made of the InP-based semiconductor, it is possible to obtain an excellent effect that modulation efficiency can be more easily improved in the optical modulator using the core made of the InP-based semiconductor.

DETAILED DESCRIPTION OF ILLUSTRATIVE EMBODIMENTS

Hereinafter, an optical modulator according to an embodiment of the present invention will be described with reference to FIGS. 1A to 1I. Note that FIGS. 1A to 1I show cross sections perpendicular to a waveguide direction.

Figure 1A:
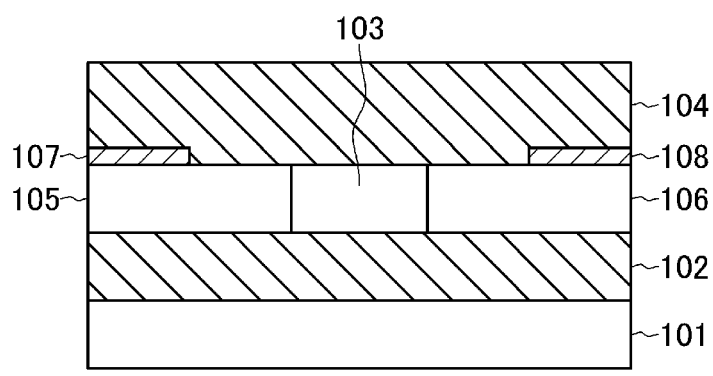
FIG. 1A is a sectional view showing a configuration of an optical modulator according to an embodiment of the present invention.

The optical modulator according to the embodiment includes a lower cladding layer 102 formed on a substrate 101, a core 103 formed on the lower cladding layer 102, and an upper cladding layer 104 formed on the core 103, as shown in FIG. 1A. The lower cladding layer 102, core 103, and upper cladding layer 104 constitute an optical waveguide. For example, the lower cladding layer 102, core 103, and upper cladding layer 104 may constitute an optical waveguide that satisfies single mode conditions.

Refractive indexes of the lower cladding layer 102 and upper cladding layer 104 are equal to or less than a refractive index of InP. The lower cladding layer 102 and upper cladding layer 104 are made of, for example, silicon oxide. The core 103 is made of an InP-based semiconductor having a bandgap corresponding to a desired wavelength. The core 103 is made of, for example, InGaAsP. In this case, the wavelength of light to be modulated is in a communication wavelength band of 1.5 Fn. The substrate 101 may be, for example, a silicon substrate. The lower cladding layer 102 and upper cladding layer 104 may be made of a material having a lower refractive index than InP, and are not limited to silicon oxide.

The optical modulator includes a first semiconductor layer 105 of a first conductive type and a second semiconductor layer 106 of a second conductive type formed with the core 103 interposed therebetween in a direction horizontal to a plane of the substrate 101. The first conductive type is, for example, n-type, whereas the second conductive type is, for example, p-type. A first electrode 107 is formed on the first semiconductor layer 105 by ohmic connection, and a second electrode 108 is formed on the second semiconductor layer 106 by ohmic connection.

These first semiconductor layer 105, second semiconductor layer 106, first electrode 107, and second electrode 108 constitute electric field application means for the core 103. The first electrode 107 and second electrode 108 are disposed so as not to overlap with the core 103 in plan view. The first semiconductor layer 105 and second semiconductor layer 106 have a smaller refractive index than the core 103, and also function as cladding that confines light in the core 103 in a direction parallel to the plane of the substrate 101.

The core 103 has n-type or p-type impurities introduced thereinto and has a conductive type. When an electric field is applied to the core 103 by the electric field application means described above, part of the core 103 is depleted and the phase of light propagating (guided) through the optical waveguide is modulated. As described above, since each electrode is disposed so as not to overlap with the core 103 in plan view, the core 103 can be thinned in a state of reduced light absorption by the electrodes, and a propagation light mode field diameter can be reduced.

According to the optical modulator according to the embodiment described above, since the lower cladding layer 102 and upper cladding layer 104 are made of materials, such as silicon oxide, having a refractive index equal to or smaller than that of InP, light confinement to the core 103 becomes stronger as compared with the case where they are made of InP-based semiconductors. Thereby, a part where the electric field distribution of propagation light and the charge depletion region of the core 103 overlap can be increased, and improving modulation efficiency can be more easily achieved.

Here, a method for manufacturing the optical modulator according to the embodiment described above will be simply described. For example, a growth substrate made of InP is prepared, and a growth layer made of InGaAsP goes through epitaxial growth on the growth substrate by a well-known organometallic vapor phase growing method. Next, the grown growth layer is patterned by a known lithography technique and etching technique to form the core 103. Next, by growing InP again on the growth substrate on both sides of the core 103, the first semiconductor layer 105 and second semiconductor layer 106 are formed.

Next, the substrate 101 on which the lower cladding layer 102 is formed is bonded on the core 103, first semiconductor layer 105, and second semiconductor layer 106 formed on the growth substrate by a known bonding technique. For example, the lower cladding layer 102 may be formed on the substrate 101 made of silicon by depositing silicon oxide by a known deposition method such as CVD (Chemical Vapor Deposition) method. Then, by removing the growth substrate, the lower cladding layer 102 is formed on the substrate 101, and thereby a state is obtained in which the core 103, first semiconductor layer 105, and second semiconductor layer 106 are formed on the lower cladding layer 102.

Next, the first electrode 107 and second electrode 108 are formed on the first semiconductor layer 105 and second semiconductor layer 106, respectively. Thereafter, the upper cladding layer 104 is formed by depositing silicon oxide on the first semiconductor layer 105 and second semiconductor layer 106 with the first electrode 107 and second electrode 108 formed, respectively, and the core 103 by a sputtering method or the like, and the optical modulator according to the embodiment described above is obtained.

Figure 1B:
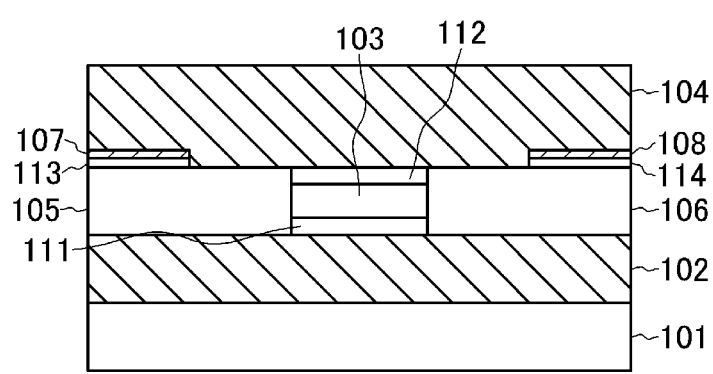
FIG. 1B is a sectional view showing another configuration of the optical modulator according to the embodiment of the present invention.

As shown in FIG. 1B, a semiconductor layer 111 and a semiconductor layer 112 may be disposed above and below the core 103. The semiconductor layer iii and semiconductor layer 112 are made of, for example, InP. In addition, the first electrode 107 may be connected via a contact layer 113 on the first semiconductor layer 105. Similarly, the second electrode 108 may be connected via a contact layer 114 on the second semiconductor layer 106. The contact layer 113 and contact layer 114 may be made of, for example, InGaAs. The contact layer 113 may be formed by introducing impurities of the first conductive type at a higher concentration, whereas the contact layer 114 may be formed by introducing impurities of the second conductive type at a higher concentration.

The core 103 may have, for example, a multiple quantum well structure. Note that the core 103 may be in an undoped state.

Figure 1C:
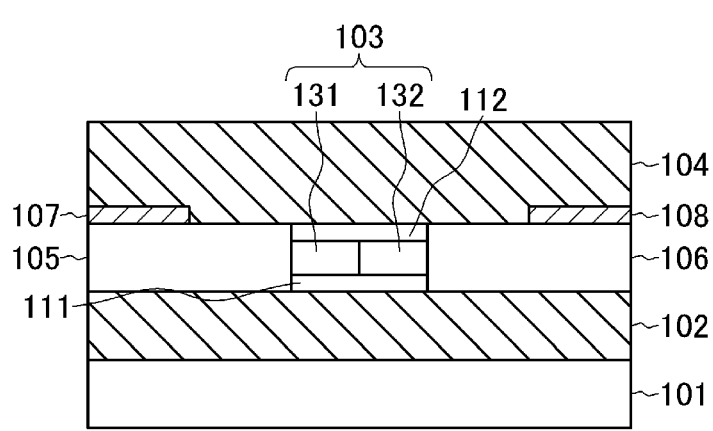
FIG. 1C is a sectional view showing another configuration of the optical modulator according to the embodiment of the present invention.

As shown in FIG. 1C, the core 103 may include a first core 131 of the first conductive type and a second core 132 of the second conductive type. In this example, the first core 131 and second core 132 are formed in the state of being disposed in the direction parallel to the plane of the substrate 101. In this way, by forming the core 103 from the first core 131 and second core 132, the peak of an optical electric field and a p-n junction (charge depletion region) are close to each other, and a part where these overlap increases and it is promising for high modulation efficiency.

When the core 103 is made of InGaAsP, an acceptor introduced into the second core 132 to be made, for example, p-type has a large light absorption coefficient, whereas an amount of refractive index change due to carrier plasma effect is very small. For this reason, it is better that the density of the acceptor is lower than the density of a donor introduced into the first core 131 to be made n-type so that the second core 132 is easily depleted.

Figure 1D:
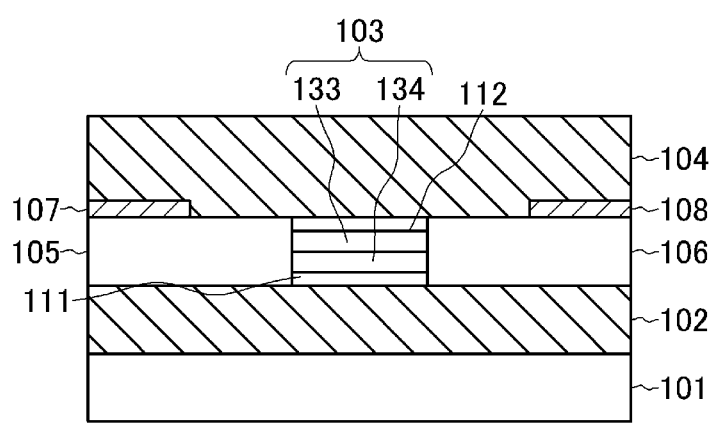
FIG. 1D is a sectional view showing another configuration of the optical modulator according to the embodiment of the present invention.

As shown in FIG. 1D, a first core 133 of the first conductive type and a second core 134 of the second conductive type may be formed in a state of being stacked on the lower cladding layer 102. With this configuration, both of two cores of the first core 133 and second core 134 constituting the core 103 are formed in contact with the first semiconductor layer 105 and second semiconductor layer 106. In the case of this configuration, an electric field is applied to the core 103 also in a direction perpendicular to the plane of the substrate 101. Since the mode diameter of light propagating through the core 103 is smaller in the direction perpendicular to the substrate 101, this structure, in which the depletion layer extends in the perpendicular direction, makes a part where the light and depletion region overlap larger.

Figure 1E:
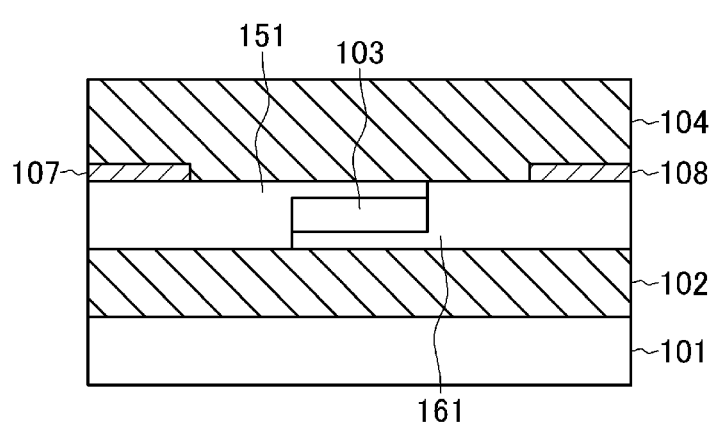
FIG. 1E is a sectional view showing another configuration of the optical modulator according to the embodiment of the present invention.

The semiconductor layer 111 and semiconductor layer 112 may have impurities introduced thereinto and have conductive types. For example, the semiconductor layer 111 may have the first conductive type, and the semiconductor layer 112 may have the second conductive type. When the semiconductor layer 111 and semiconductor layer 112 are made of InP, as shown in FIG. 1E, a configuration is obtained which includes a first semiconductor layer 151 of the first conductive type and a second semiconductor layer 161 of the second conductive type, formed with the core 103 interposed therebetween in the directions horizontal and perpendicular to the plane of the substrate 101.

Figure 1F:
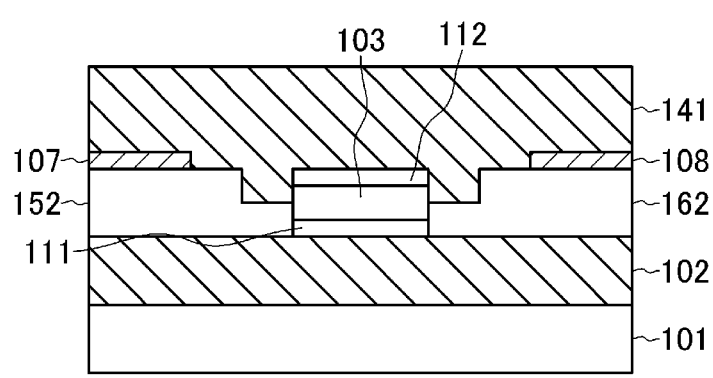
FIG. 1F is a sectional view showing another configuration of the optical modulator according to the embodiment of the present invention.

As shown in FIG. 1F, a configuration may include a first semiconductor layer 152 of the first conductive type and a second semiconductor layer 162 of the second conductive type, formed with the core 103 interposed therebetween in the direction horizontal to the plane of the substrate 101. The first semiconductor layer 152 and second semiconductor layer 162 are thinned on both sides of the core 103. The thinned parts are buried by an upper cladding layer 141. With this configuration, it is possible to further improve light confinement to the core 103 and it is promising for high modulation efficiency. In this case, the first semiconductor layer 152 and second semiconductor layer 162 do not need to have a function as cladding.

Figure 1G:
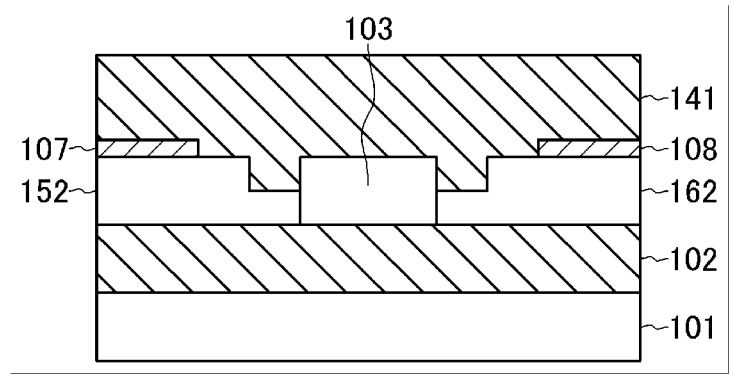
FIG. 1G is a sectional view showing another configuration of the optical modulator according to the embodiment of the present invention.

The configuration described with reference to FIG. 1F may be made to a configuration as shown in FIG. 1G in which the lower surface of the core 103 is formed in contact with the lower cladding layer 102, and the upper cladding layer 141 is formed in contact with the upper surface of the core 103. This configuration is a state in which the semiconductor layer 111 and semiconductor layer 112 shown in FIG. 1F are not provided.

Figure 1H:
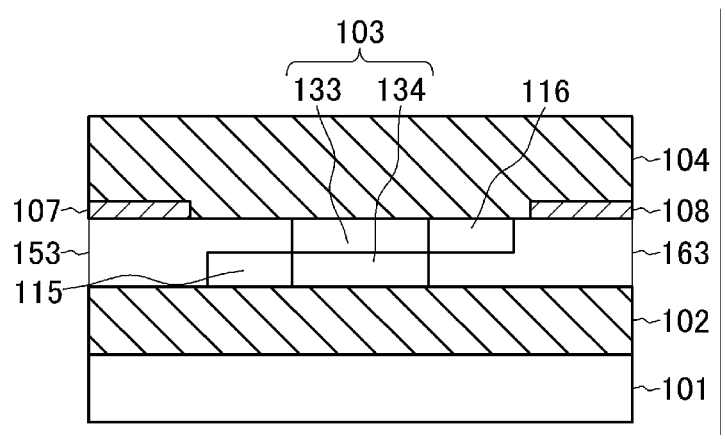
FIG. 1H is a sectional view showing another configuration of the optical modulator according to the embodiment of the present invention.

As shown in FIG. 1H, on one side of the core 103, a first semiconductor layer 153 may be formed in contact only with the first core 133 in the core 103, whereas on the other side of the core 103, a second semiconductor layer 163 may be formed in contact only with the second core 134 in the core 103. The first semiconductor layer 153 has the first conductive type (for example, n-type), whereas the second semiconductor layer 163 has the second conductive type (for example, p-type).

On one side of the core 103, a lateral cladding layer 115 made of a semi-insulating semiconductor is formed in contact with the second core 134. On the other side of the core 103, a lateral cladding layer 116 made of a semi-insulating semiconductor is formed in contact with the first core 133. The first semiconductor layer 153, second semiconductor layer 163, lateral cladding layer 115, and lateral cladding layer 116 may be made of, for example, InP. For example, the lateral cladding layer 115 and lateral cladding layer 116 may be made of InP which is doped with Fe and made semi-insulating.

By configuring as described above, a p-n junction is formed in the direction perpendicular to the substrate 101, in which the part where the electric field distribution of light guided through the core 103 overlaps with the charge depletion region is large, and an electric field is applied there. On the other hand, a p-n junction is not formed in the direction horizontal to the plane of the substrate 101, in which the part where the electric field distribution of light guided through the core 103 overlaps with the charge depletion region is small. As a result, parasitic capacitance can be reduced, which is advantageous for speeding up. Note that the lateral cladding layer 115 and lateral cladding layer 116 may be made of an insulator such as $SiO_2$ or air.

Figure 1I:
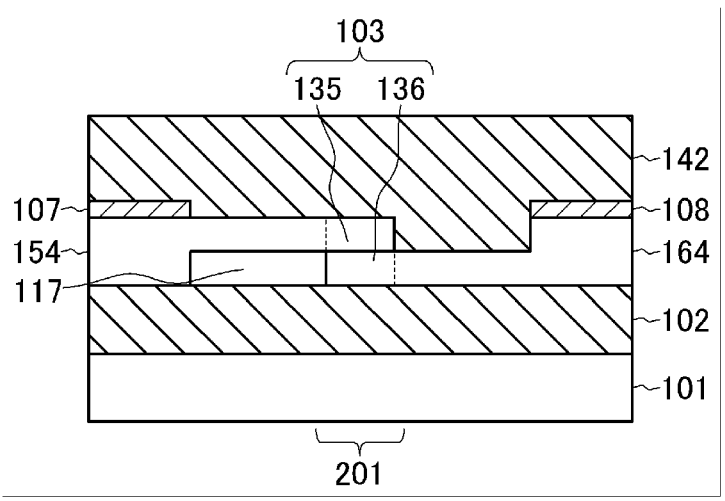
FIG. 1I is a sectional view showing another configuration of the optical modulator according to the embodiment of the present invention.

As shown in FIG. 1I, a first semiconductor layer 154 of the first conductive type and a second semiconductor layer 164 of the second conductive type may be formed on the lower cladding layer 102.

The first semiconductor layer 154 is formed apart from the lower cladding layer 102 in a core formation region 201. In a region apart from the lower cladding layer 102, a lateral cladding layer 117 made of an air layer is provided between the lower cladding layer 102 and first semiconductor layer 154. On the other hand, the second semiconductor layer 164 is formed apart from an upper cladding layer 142 in the core formation region 201. In a region apart from the upper cladding layer 142 in the core formation region 201, the first semiconductor layer 154 is disposed between the second semiconductor layer 164 and upper cladding layer 142.

In the optical modulator with the configuration described above, in the core formation region 201, a part of the first semiconductor layer 154 and a part of the second semiconductor layer 164 are stacked to form the core 103. The first semiconductor layer 154 in the core formation region 201 becomes a first core 135 of the first conductive type and the second semiconductor layer 164 in the core formation region 201 becomes a second core 136 of the second conductive type.

As described with reference to FIGS. 1D, 1H, and 1I, when the core 103 made of InGaAsP is composed of the part of the first conductive type and the part of the second conductive type and these parts (p-n conjunction) are stacked on the lower cladding layer 102, an extension direction of the core 103 is preferably aligned with the crystal direction of InGaAsP.

Figure 2A:
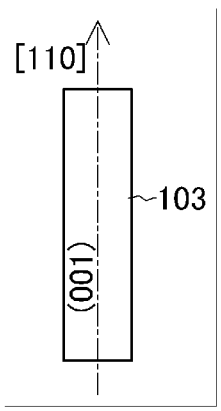
FIG. 2A is a plan view schematically showing a partial configuration of the optical modulator according to the embodiment of the present invention.

For example, when a p-type first core is disposed on the substrate side and an n-type second core is disposed thereon, as shown in FIG. 2A, the upper surface of the core 103 made of InGaAsP is set to (001), and the extension direction (propagation direction of the optical mode) of the core 103 is preferably set to a [110] axial direction of InGaAsP. It is because, in this configuration, since an electric field is applied to the core 103 in the direction perpendicular to the substrate 101, Pockels effect contributes to the refractive index change. By setting the extension direction of the core 103 to the [110] direction, the sign of the refractive index change due to the Pockels effect matches that of F-K effect, carrier plasma effect, and band filling effect. Because of this, a large amount of refractive index change can be obtained with respect to a reverse bias applied to the core 103.

Figure 2B:
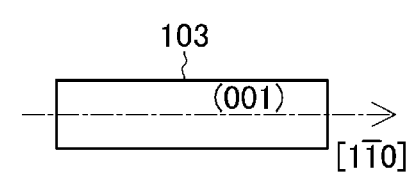
FIG. 2B is a plan view schematically showing a partial configuration of the optical modulator according to the embodiment of the present invention.
Figure 3:
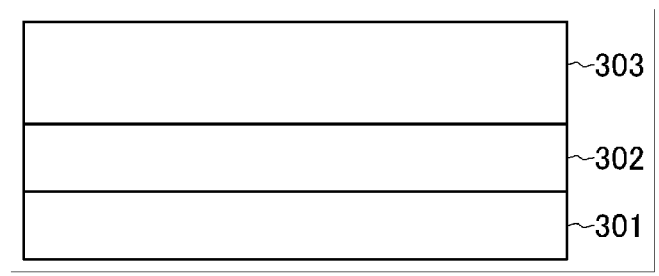
FIG. 3 is a sectional view showing a partial configuration of a conventional optical modulator.

When an n-type first core is disposed on the substrate side and a p-type second core is disposed thereon, as shown in FIG. 2B, the upper surface of the core 103 made of InGaAsP is set to (001), and the extension direction (propagation direction of the optical mode) of the core 103 is preferably set to a [1-10] axial direction of InGaAsP. This is because, in this configuration, the direction of an electric field is opposite to that in the above-described case with respect to the achieved configuration.

As described above, according to embodiments of the present invention, since the lower cladding layer and upper cladding layer having a refractive index equal to or less than that of InP are disposed above and below the core made of the InP-based semiconductor, in the optical modulator using the core made of the InP-based semiconductor, it is possible to more easily improve modulation efficiency.

The present invention is not limited to the embodiment described above, and it is obvious that many modifications and combinations are possible within the technical idea of the invention by those with ordinary knowledge in the art.

REFERENCE SIGNS LIST

101 Substrate
102 Lower cladding layer
103 Core
104 Upper cladding layer
105 First semiconductor layer
106 Second semiconductor layer
107 First electrode
108 Second electrode.

The invention claimed is:

1. An optical modulator, comprising:
a lower cladding layer having a refractive index equal to or less than a refractive index of InP, on a substrate;
a core on the lower cladding layer, wherein the core is made of InGaAsP;
an upper cladding layer having a refractive index equal to or less than the refractive index of InP, on the core; and
an electric field applicator that is configured to apply an electric field to the core, wherein the electric field applicator includes a first semiconductor layer of a first conductive type and a second semiconductor layer of a second conductive type, wherein the first conductive type and the second conductive type are n-type and p-type, respectively, wherein the core is interposed between the first semiconductor layer and the second semiconductor layer in a direction parallel to a plane of the substrate, wherein each of the first semiconductor layer and the second semiconductor layer is made of InP and has a refractive index smaller than a refractive index of the core, wherein the core includes a first core of the first conductive type and a second core of the second conductive type, the second core directly contacting the first core, and wherein a density of an acceptor making the second core p-type is lower than a density of a donor making the first core n-type.

2. The optical modulator according to claim 1, wherein the lower cladding layer and the upper cladding layer are made of silicon oxide.

3. The optical modulator according to claim 1, wherein the first core and the second core are disposed side by side in the direction parallel to the plane of the substrate.

4. The optical modulator according to claim 1, wherein the first core and the second core are stacked on the lower cladding layer.

5. The optical modulator according to claim 4, wherein:
on a first side of the core, the first semiconductor layer is in contact with the first core of the core; and
on a second side of the core, the second semiconductor layer is in contact with the second core.

6. A method of forming an optical modulator, the method comprising:
forming a lower cladding layer having a refractive index equal to or less than a refractive index of InP on a substrate;
forming a core formed on the lower cladding layer, wherein the core is made of InGaAsP;
forming an upper cladding layer having a refractive index equal to or less than the refractive index of InP on the core; and
forming an electric field applicator that is configured to apply an electric field to the core, wherein the electric field applicator includes a first semiconductor layer of a first conductive type and a second semiconductor layer of a second conductive type, wherein the first conductive type and the second conductive type are n-type and p-type, respectively, wherein the core is interposed between the first semiconductor layer and the second semiconductor layer in a direction parallel to a plane of the substrate, wherein each of the first semiconductor layer and the second semiconductor layer is made of InP and has a refractive index smaller than a refractive index of the core, wherein the core includes a first core of the first conductive type and a second core of the second conductive type, the second core directly contacting the first core, and wherein a density of an acceptor making the second core p-type is lower than a density of a donor making the first core n-type.

7. The method according to claim 6, wherein the lower cladding layer and the upper cladding layer are each made of silicon oxide.

8. The method according to claim 6, wherein the first core and the second core are disposed side by side in the direction parallel to the plane of the substrate.

9. The method according to claim 6, wherein the first core and the second core are stacked on the lower cladding layer.

10. The method according to claim 9, wherein:
on a first side of the core, the first semiconductor layer is in contact with the first core of the core; and on a second side of the core, the second semiconductor layer is in contact with the second core.

* * * * *